US009088706B2

(12) United States Patent
Wakikawa (10) Patent No.: US 9,088,706 B2
(45) Date of Patent: Jul. 21, 2015

(54) IMAGING UNIT (71) Applicant: Panasonic Corporation, Osaka (JP)

(72) Inventor: Masanao Wakikawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/160,984

(22) Filed: Jan. 22, 2014

(65) Prior Publication Data
US 2014/0211083 A1 Jul. 31, 2014

(30) Foreign Application Priority Data
Jan. 29, 2013 (JP) ................... 2013-014026

(51) Int. Cl.
H04N 5/225 (2006.01)
(52) U.S. Cl.
CPC .................. H04N 5/2254 (2013.01)
(58) Field of Classification Search
USPC ................................ 348/335, 375
See application file for complete search history.

(56) References Cited

U.S. PATENT DOCUMENTS

| 8,207,489 B2 | 6/2012 | Aiba |
| 2010/0059664 A1 | 3/2010 | Aiba |
| 2010/0209097 A1* | 8/2010 | Sasaki et al. ................... 396/529 |
| 2012/0249867 A1* | 10/2012 | Sakoda et al. ................. 348/374 |

FOREIGN PATENT DOCUMENTS

| JP | 2010-068328 A | 3/2010 |
| JP | 2012-215796 A | 11/2012 |

* cited by examiner

Primary Examiner — Anthony J Daniels
(74) Attorney, Agent, or Firm — Renner, Otto, Boisselle & Sklar, LLP (57) ABSTRACT An imaging unit comprises a mount unit, an imaging element unit, a plurality of elastic members and adjustment screws, and a filler member. The imaging element unit is disposed so that a gap is present with respect to the mount unit. The elastic members are disposed in a compressed state between the mount unit and the imaging element unit. The adjustment screws are disposed so as to be coaxial with respect to each of the elastic members and are mounted to at least one of the mount unit and the imaging element unit. The filler member is disposed so as to be coaxial with respect to at least one set comprising an elastic member and an adjustment screw, and, as the adjustment screw is tightened, the filler member is sandwiched and compressed between the mount unit and the imaging element unit.

13 Claims, 8 Drawing Sheets

IMAGING UNIT

CROSS-REFERENCE TO RELATED APPLICATIONS

This application claims priority to Japanese Patent Application No. 2013-014026 filed on Jan. 29, 2013. The entire disclosure of Japanese Patent Application No. 2013-014026 is hereby incorporated herein by reference.

BACKGROUND

The technique disclosed herein relates to an imaging unit used for an imaging device.

There are known interchangeable-lens imaging devices having a configuration for adjusting the distance from the front surface of the body mount to the light-reception surface of the imaging element (flange back) to a predetermined distance (e.g., see Patent Document 1 (JP-A 2012-215796)).

This adjustment mechanism comprises a plurality of adjustment screws and a plurality of adjustment springs. A mount unit including a body mount and an imaging element unit including an imaging element are linked by the adjustment screws, and the adjustment springs are held between the mount unit and the imaging element unit. The imaging element unit is pressed against the head of the screws by an elastic force from the adjustment springs. When the screws are turned, the imaging element unit moves relative to the mount unit in a state of being pressed against the head of the screws. It is thereby possible to adjust the distance between the mount unit and the imaging element unit, and to adjust the flange back during product assembly.

Heat generated when the imaging element has been actuated is dissipated from the imaging element unit through the screws and coil springs to the mount unit. However, since the screws and the coil springs are mainly in point contact, they are inadequately disposed to efficiently transmit the heat generated in the imaging element unit to the mount unit. In particular, when a large amount of heat is generated by the imaging element, the amount of heat dissipated will be insufficient.

SUMMARY

An object of the technique disclosed herein is to provide an imaging unit in which position adjustment during assembly can be readily performed and the efficiency of dissipating heat generated in the imaging element unit can be improved.

The imaging unit disclosed herein is an imaging unit configured to generate image data from an optical image of a subject formed by an interchangeable lens unit, the imaging unit being provided with a mount unit, an imaging element unit, a plurality of elastic members, a plurality of adjustment screws, and a filler material. The mount unit can have an interchangeable lens unit mounted thereto. The imaging element unit is disposed so that a gap is present with respect to the mount unit, and generates image data representing the subject by photoelectric conversion. The elastic members are disposed in a compressed state between the mount unit and the imaging element unit. The adjustment screws are disposed so as to be coaxial with respect to each of the elastic members, are mounted to on the mount unit and/or the imaging element unit, and adjust the distance between the mount unit and the imaging element unit. The filler member is disposed so as to be coaxial with respect to at least one set of an elastic member and an adjustment screw, the filler member being compressed from either side between the mount unit and the imaging element unit as the adjustment screw is tightened.

According to the technique disclosed herein, it is possible to provide an imaging unit in which positional adjustment during assembly can be readily performed and the efficiency of heat dissipation during actuation can be improved.

DETAILED DESCRIPTION OF PREFERRED EMBODIMENT

Embodiments will now be described through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventor has provided the appended drawings and the following description so that a person skilled in the art may fully understand this disclosure, but does not intend for these to limit what is discussed in the patent claims.

1: Digital Camera 1

A digital camera 1 of the present embodiment will now be described with reference to the accompanying drawings.

Figure 1:
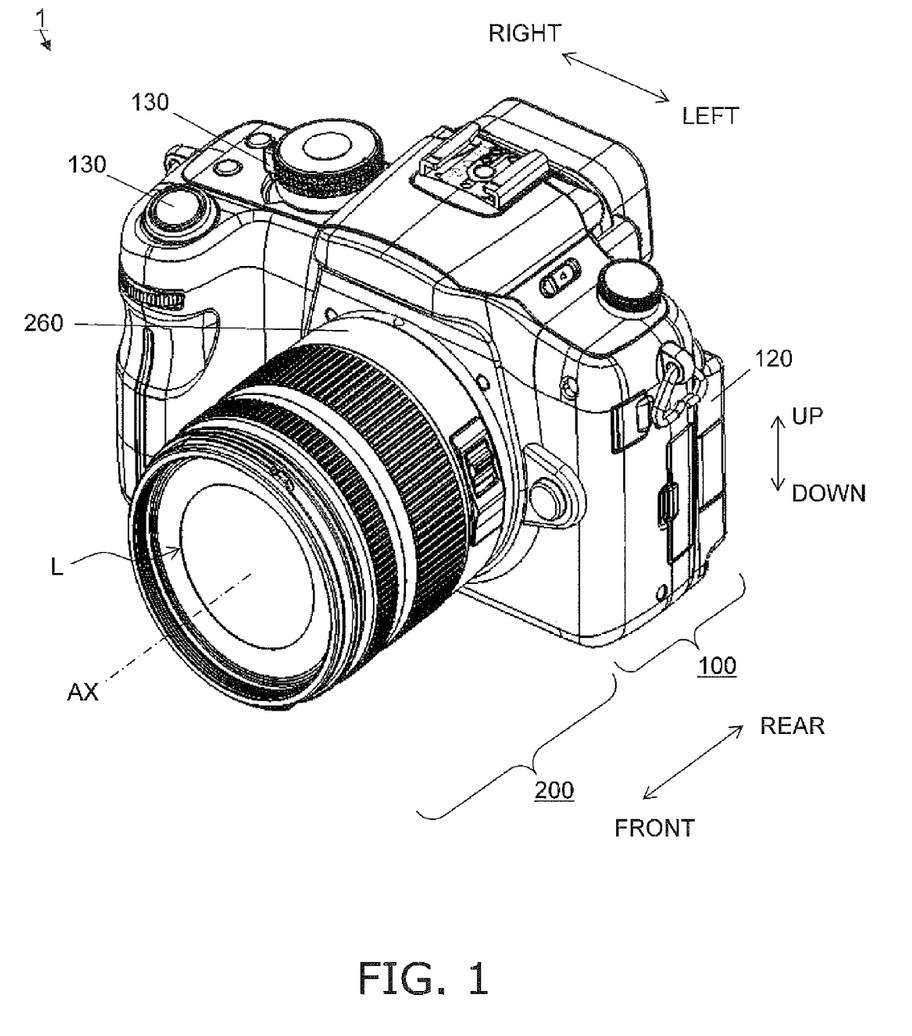
FIG. 1 is a perspective view of a digital camera installed with an imaging unit according to an embodiment of the present disclosure.

As shown in FIG. 1, in the following descriptions, in relation to the digital camera 1 in a normal orientation (also referred to hereafter as landscape orientation), the direction towards the subject is referred to as "forward", the direction away from the subject is referred to as "rearward", the vertically upward direction is referred to as "upward", the vertically downward direction is referred to as "downward", the direction to the right of the subject is referred to as "rightward", and the direction to the left of the subject is referred to as "leftward". The optical axis AX of an interchangeable lens unit 200 is disposed substantially parallel to the longitudinal direction.

Similarly, the terms "front", "back", "up", "down", "right", and "left" in the following descriptions signify directions in relation to the digital camera in a longitudinal orientation facing the subject. The term "longitudinal orientation" represents an orientation of the digital camera 1 in which the direction of the long sides of a horizontally long rectangular image substantially matches the horizontal direction in the image.

These terms are not intended to limit the orientation in which the digital camera 1 is used in the present embodiment, or the layout of constituent elements in the digital camera 1.

The digital camera 1 according to the present embodiment (an example of an imaging device) is an interchangeable lens digital camera comprising a main camera body 100 and an interchangeable lens unit 200 that can be mounted on the main camera body 100, as shown in FIG. 1.

2. Main Camera Body 100

Figure 2:
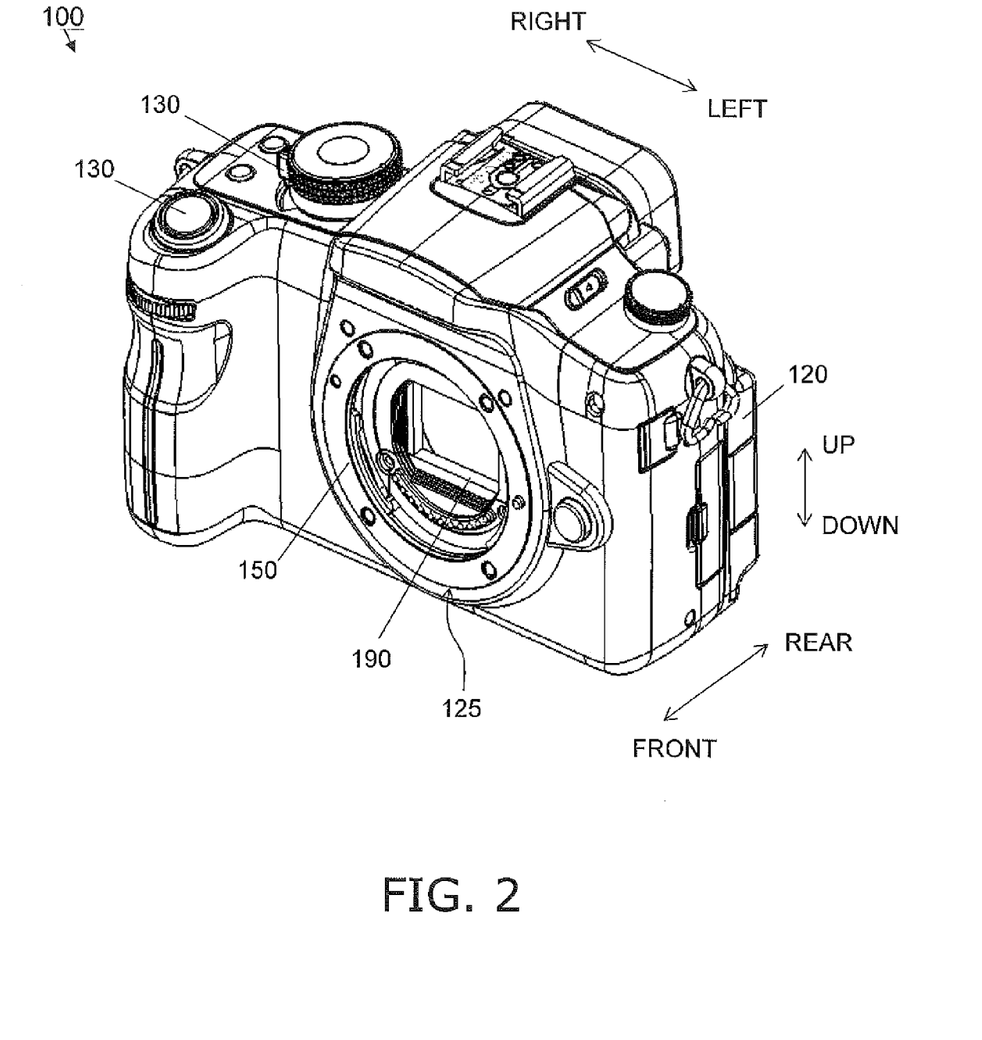
FIG. 2 is a perspective view of a main camera body of the digital camera in FIG. 1.
Figure 3:
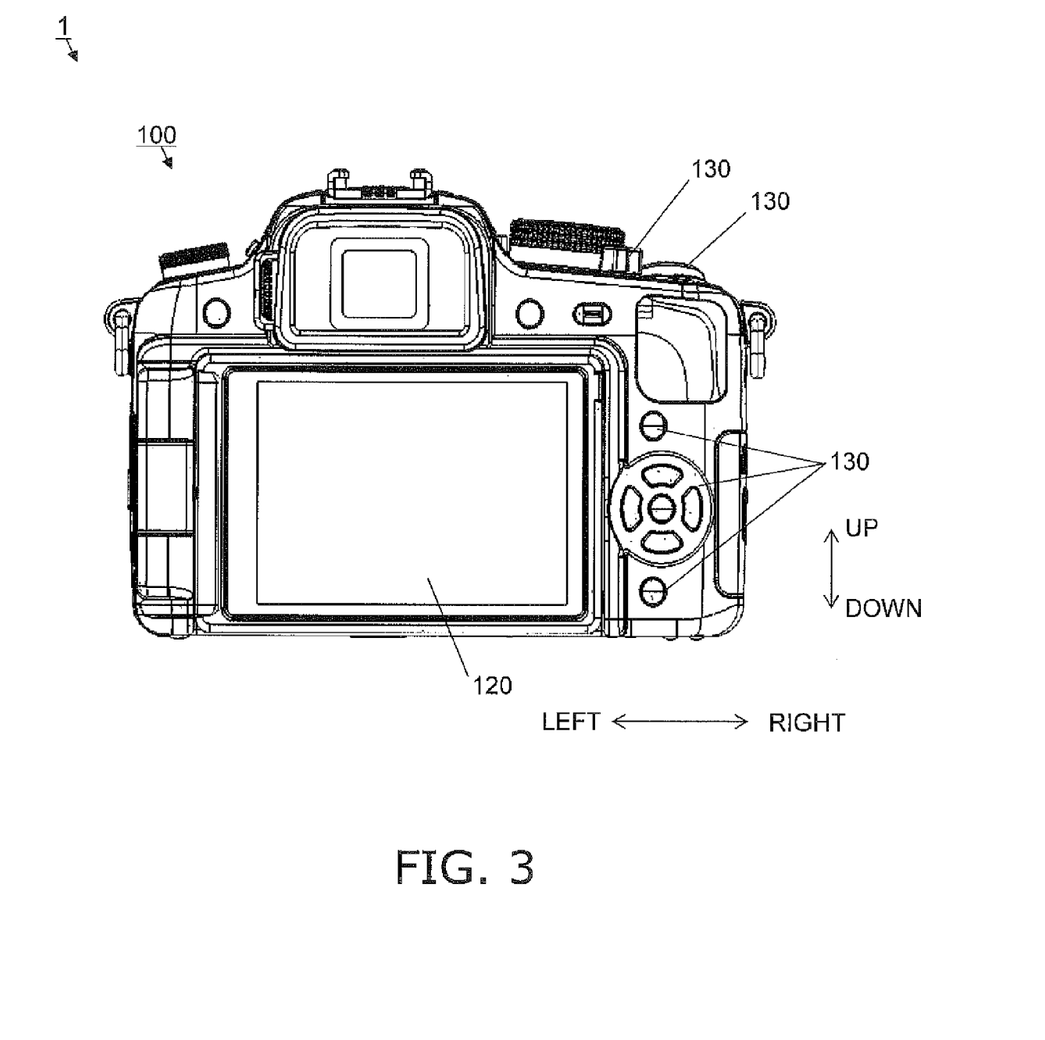
FIG. 3 is a rear view of the main camera body of the digital camera in FIG. 1.
Figure 4:
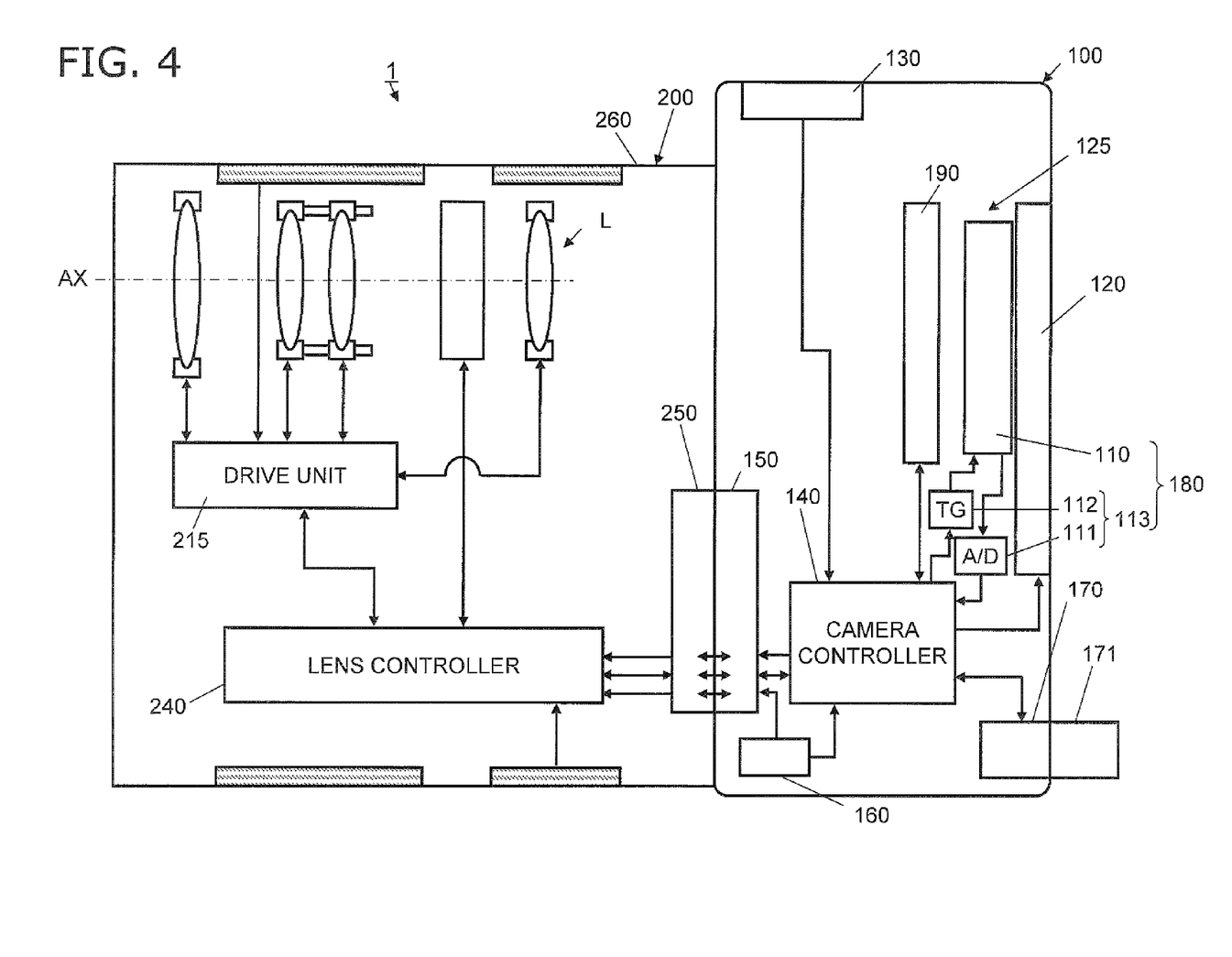
FIG. 4 is a control block diagram of the digital camera in FIG. 1.

As shown in FIGS. 2 and 3, the main camera body 100 (an example of an imaging device) comprises an imaging unit 125 (an example of an imaging unit), a camera monitor 120, and an operation unit 130. As shown in FIG. 4, the main camera body 100 is further provided with a camera controller 140 (an example of a drive control unit), a power source 160, and a card slot 170. The detailed configuration of the imaging unit 125 will be described further below.

The camera monitor 120 is, e.g., a liquid crystal display. The camera monitor 120 displays an image on the basis of display image data.

The display image data is generated by a camera controller 140 shown in FIG. 4. The display image data is, e.g., data for displaying image data that has been image-processed, and information such as an operation menu or the image-capture conditions regarding the digital camera 1, as an image.

The operation unit 130 comprises buttons, levers, dials, a touch panel, or the like. The operation unit 130 is connected to the camera controller 140 and is operated by the user.

The card slot 170 is capable of having a memory card 171 mounted thereto. The card slot 170 controls the memory card 171 on the basis of a control signal transmitted from the camera controller 140. Specifically, the card slot 170 can store image data (still image data and moving image data) on the memory card 171 or output image data from the memory card 171.

The power source 160 supplies power to each part of the digital camera 1. The power source 160 may be a dry cell or a rechargeable battery. The power source 160 may also be a unit for receiving supply of power from an external power source and supplying power to the digital camera 1 through a power supply cord or the like.

The camera controller 140 controls each part of the main camera body 100, and controls the whole of the digital camera 1 in a state in which the interchangeable lens unit 200 is mounted on the main camera body 100. The camera controller 140 controls each part of the digital camera 1 on the basis of operation information inputted into the operation unit 130. The camera controller 140 transmits a signal for controlling the interchangeable lens unit 200 through a mount unit 150 and a lens mount 250 to a lens controller 240, and controls each part of the interchangeable lens unit 200 through the lens controller 240.

The interchangeable lens unit 200 can be mounted on the main camera body 100 and forms an optical image of the subject. Specifically, the interchangeable lens unit 200 has an optical system L, a lens cylinder 260, a drive unit 215, a lens mount 250, and a lens controller 240.

3. Interchangeable Lens Unit 200

The optical system L forms an optical image of the subject on a light-receiving surface of a CMOS image sensor 110.

The lens mount 250 is fixed to the lens cylinder 260. The drive unit 215 drives an aperture unit and/or a lens group of the optical system L. The lens controller 240 controls the whole of the interchangeable lens unit 200 on the basis of a control signal transmitted from the camera controller 140. For example, the lens controller 240 controls the drive unit 215 on the basis of a control signal transmitted from the camera controller 140. The optical image formed by the interchangeable lens unit 200 is incident on the imaging unit 125.

4. Imaging Unit 125

Figure 5:
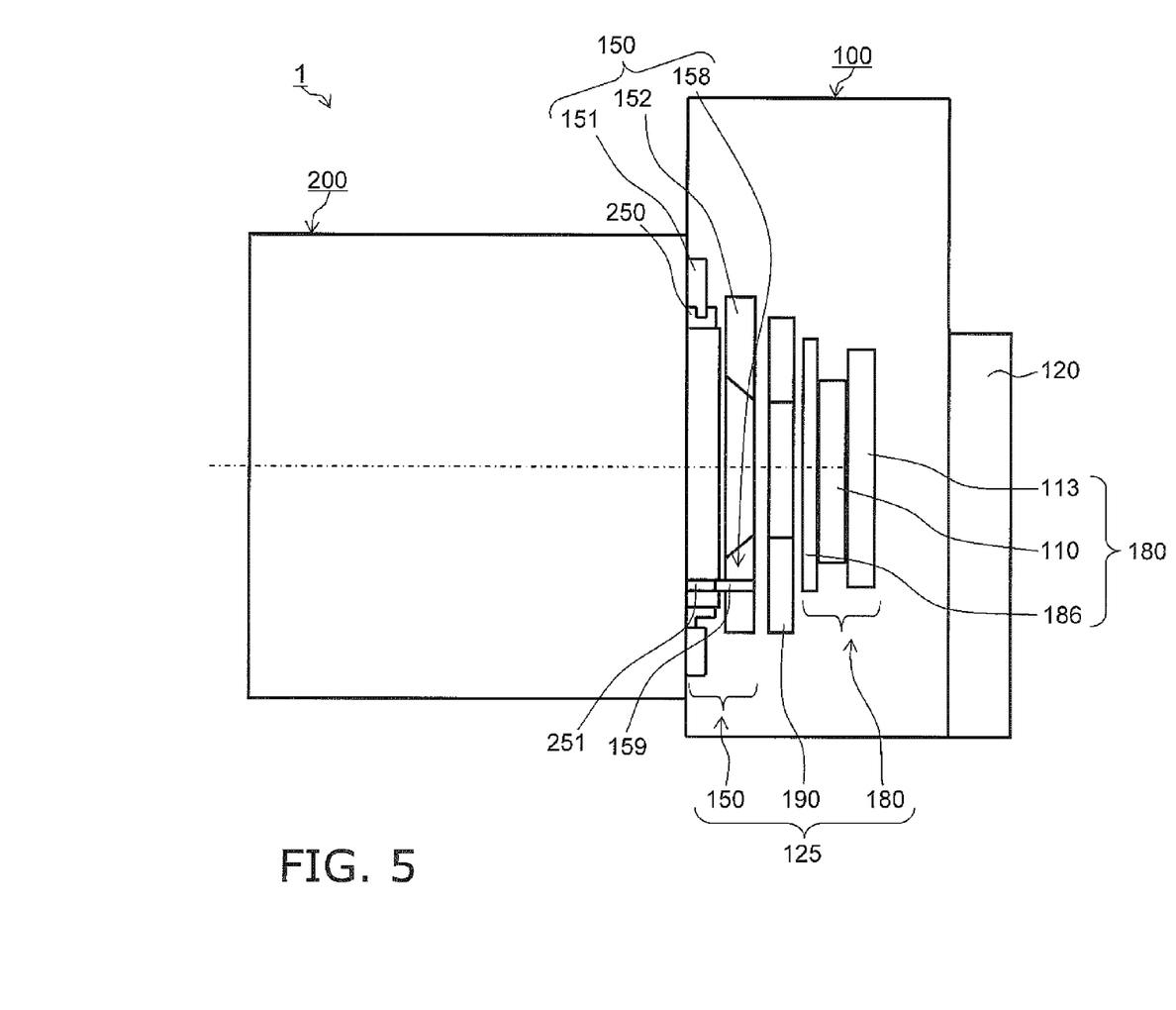
FIG. 5 is a schematic cross-section view of the digital camera in FIG. 1.

As shown in FIG. 5, the imaging unit 125 has a mount unit 150 (an example of a mount unit), an imaging element unit 180 (an example of an imaging element unit), and a focal plane shutter device 190 (an example of a shutter device). The mount unit 150, the focal plane shutter device 190, and the imaging element unit 180 are arranged in sequence from the subject side.

The lens mount 250 of the interchangeable lens unit 200 is mounted on the mount unit 150.

The imaging element unit 180 and the focal plane shutter device 190 are mounted on the mount unit 150.

The focal plane shutter device 190 adjusts the amount of light incident on the imaging element unit 180. The focal plane shutter device 190 is disposed on the subject side of the imaging element unit 180, and is disposed between the mount unit 150 and the imaging element unit 180.

The digital camera 1 is a "mirrorless" SLR camera which does not have a quick return mirror between the mount unit 150 and the imaging element unit 180.

Figure 6:
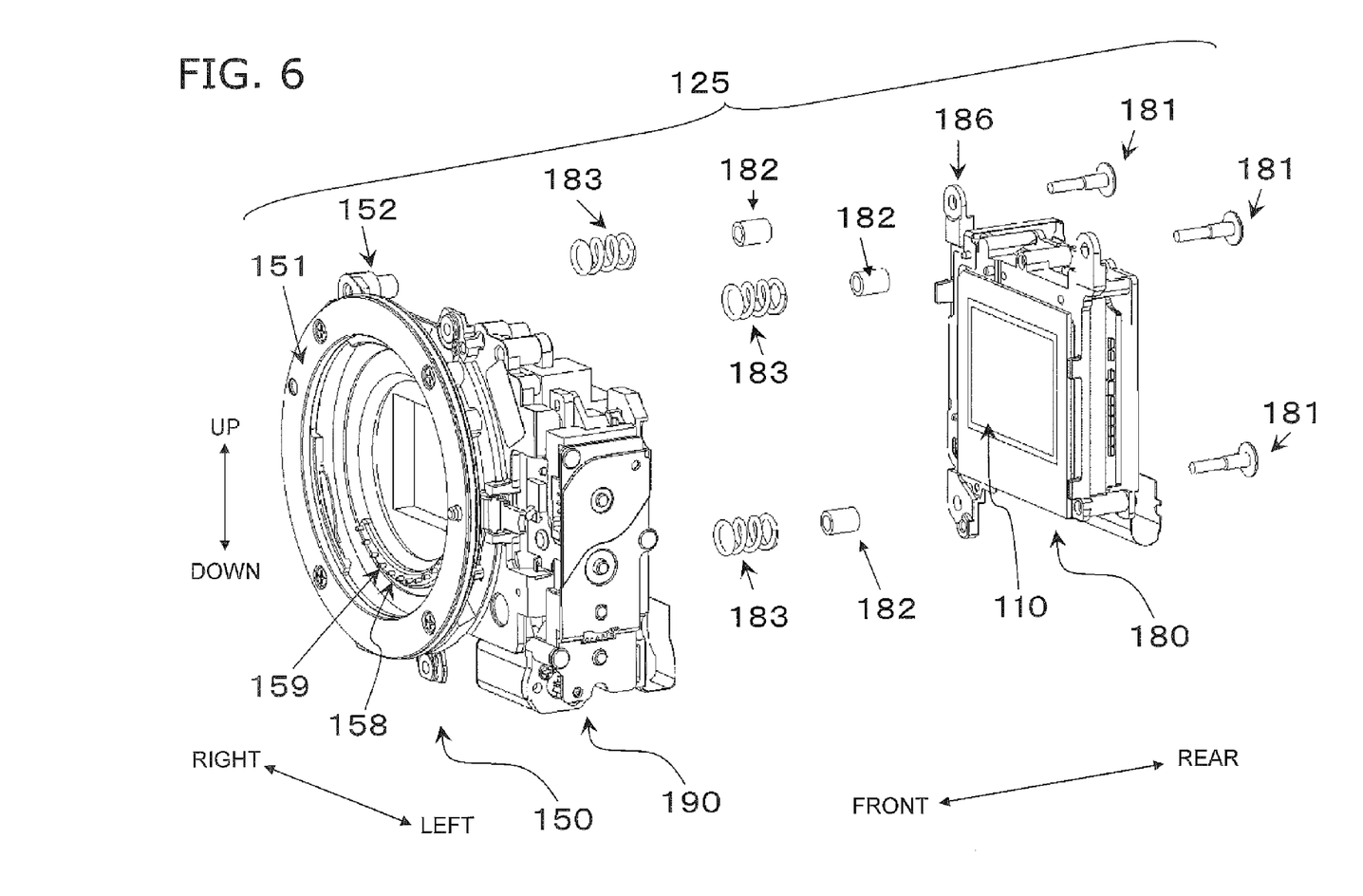
FIG. 6 is an exploded perspective view of the imaging unit installed on the digital camera in FIG. 1.

As shown in FIGS. 5 and 6, the mount unit 150 has a body mount 151, a contact point unit 158, and a mount base 152.

The lens mount 250 of the interchangeable lens unit 200 can be bayonet-joined to the body mount 151.

The body mount 151 is made from a metal and fixed to the mount base 152.

The mount base 152 is made from a metal and fixed to a main frame (not shown) of the main camera body 100.

In a state in which the interchangeable lens unit 200 is mounted on the body mount 151, the interchangeable lens unit 200 is supported by the mount unit 150.

The contact point unit 158 is made from a resin, and as shown in FIG. 6, has a plurality of contact points 159 and is, e.g., fixed to the mount base 152. In a state in which the lens mount 250 is mounted on the mount unit 150, the main camera body 100 and the interchangeable lens unit 200 are electrically connected.

More specifically, as shown in FIG. 5, in a state in which the lens mount 250 is mounted on the mount unit 150, the contact points 159 of the contact point unit 158 is in contact with contact points 251 of the interchangeable lens unit 200. Therefore, the main camera body 100 is able to transmit and receive, through the contact point unit 158, data and/or a control signal to and from the interchangeable lens unit 200.

As shown in FIG. 6, each of the body mount 151, the contact point unit 158, and the mount base 152 has an opening. Light is incident on the focal plane shutter device 190 and the imaging element unit 180 through the openings.

As shown in FIG. 5, the imaging element unit 180 has a complementary metal oxide semiconductor (CMOS) image sensor 110 (an example of an imaging element), a CMOS circuit board 113, and a heat dissipation plate 186 (an example of a plate member).

The CMOS image sensor 110 generates image data by photoelectric conversion from an optical image of the subject (may hereafter be referred to as a subject image) formed by the interchangeable lens unit 200. The electric charge accumulated in each of the photoelectric conversion elements of the CMOS image sensor 110 is read, whereby image data representing the subject is generated. As shown in FIG. 4, the image data read from the CMOS image sensor 110 is digitalized by an AD converter 111 of the CMOS circuit board 113.

The image data digitalized by the AD converter 111 is subjected to a variety of image processing in the camera controller 140. With regards to the variety of image processing, examples include gamma correction, white balance correction, defect correction, YC conversion, electronic zoom, and JPEG compression.

The CMOS image sensor 110 (an example of an imaging element) actuates on the basis of a timing signal generated by a timing generator 112 of the CMOS circuit board 113. The CMOS image sensor 110, through control performed by the CMOS circuit board 113, acquires still image data and moving image data. The moving image data acquired by the CMOS image sensor 110 is also used for displaying a through-the-lens image.

A through-the-lens image refers to an image, represented by the moving image data, that is not recorded on the memory card 171, and refers to a real-time image of the subject in live view display. The through-the-lens image is mainly a moving image, and is displayed in real time on the camera monitor 120 in order to determine the layout of the moving image or the still image.

The CMOS image sensor 110 is capable of acquiring a low-resolution moving image used as the through-the-lens image, and a high-resolution moving image used for recording. Examples of a high-resolution moving image include a HD-size (high definition television size: 1920×1080 pixels) moving image.

The CMOS circuit board 113 controls the CMOS image sensor 110. The CMOS circuit board 113 is a circuit board for performing predetermined processing on the image data outputted from the CMOS image sensor 110, and includes, as shown in FIG. 4, the timing generator 112 and the AD converter 111. The CMOS circuit board 113 is included in a drive controller for controlling the imaging element.

Figure 7:
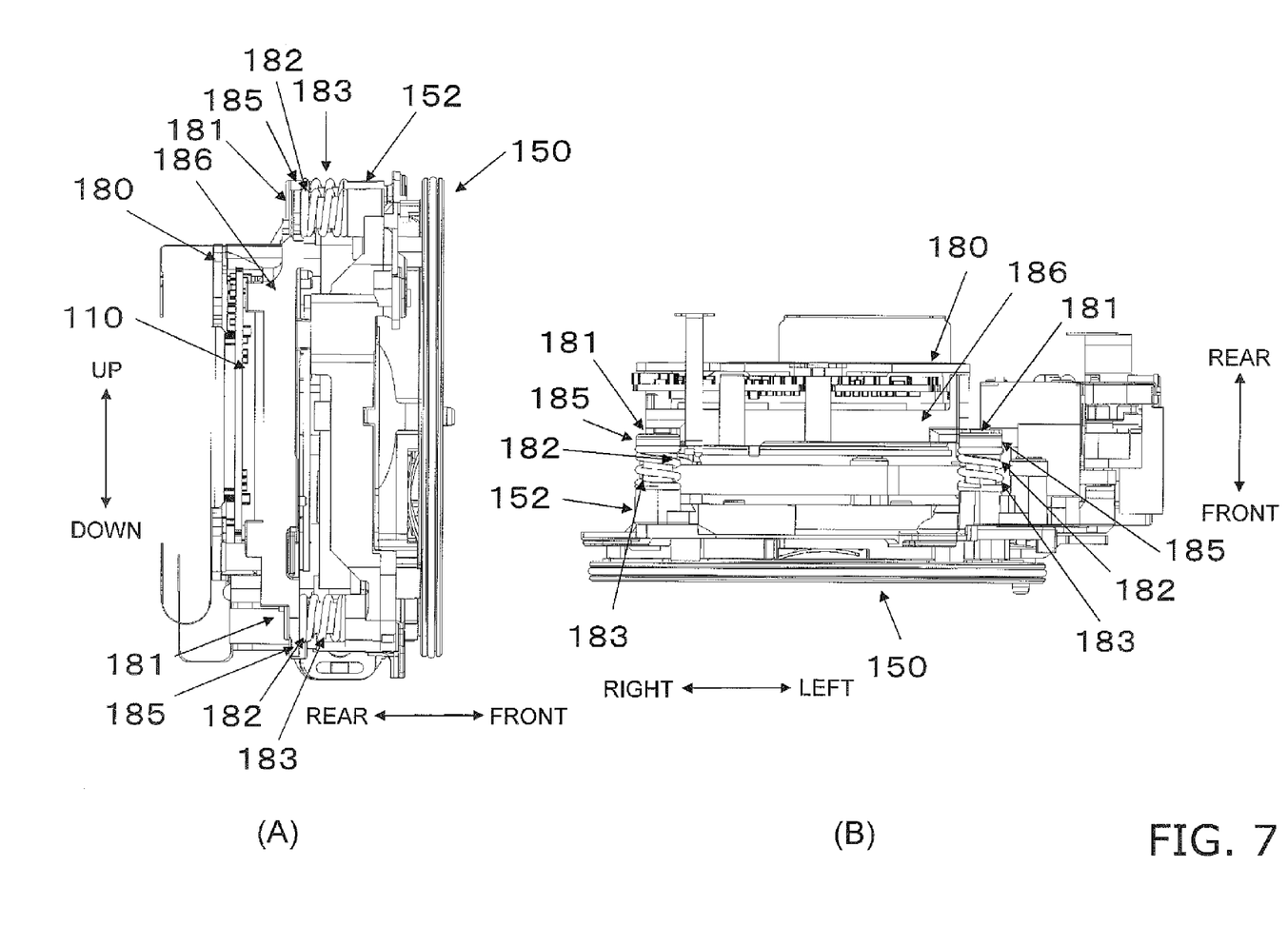
FIG. 7(A) is a side view of the imaging unit in FIG. 6.
FIG. 7(B) is a top view of the imaging unit in FIG. 6.

The heat dissipation plate 186 shown in FIG. 6 (an example of a plate member) is made from a material having a high heat conductivity, such as a metal. The heat dissipation plate 186 is provided to allow heat generated in the CMOS image sensor 110 to escape, and is connected to the CMOS image sensor 110. More specifically, the heat dissipation plate 186 is mounted on the mount unit 150, and disposed so that a gap is present with respect to the mount unit 150 (see, e.g., FIGS. 7(A) and (B)). The heat dissipation plate 186 will be described in further detail further below.

As shown in FIG. 6, the focal plane shutter device 190 (an example of a shutter device) is disposed on the front side (subject side) of the CMOS image sensor 110, and controls the exposure of the CMOS image sensor 110. The focal plane shutter device 190 switches between an open state, in which light is incident on the CMOS image sensor 110, and a closed state, in which light traveling so as to be incident on the CMOS image sensor 110 is shielded.

5. Detailed Configuration of Imaging Unit 125

The detailed configuration of the imaging unit 125 will now be described.

For example, a configuration in which the imaging element unit 180 is mounted, by screwing, on the mount unit 150 is preferable in terms of obtaining a simple attachment structure.

However, upon taking dimensional errors of members constituting the mount unit 150 and the imaging element unit 180 into consideration, there is a risk that simply mounting the imaging element unit 180 on the mount unit 150 will result in a variation in the flange back between each product item.

Accordingly, the main camera body 100 has a structure enabling adjustment of the distance between the mount unit 150 and the imaging element unit 180.

More specifically, as shown in FIG. 6, the imaging element unit 180 is mounted on the mount unit 150 by three adjustment screws 181 and three adjustment springs 183 (an example of an elastic member). In the present embodiment, the heat dissipation plate 186 portion of the imaging element unit 180 is mounted on the mount base 152 of the mount unit 150 using three adjustment screws 181 and three adjustment springs 183.

As shown in FIGS. 7(A) and 7(B), the three adjustment springs 183 (an example of an elastic member) are disposed in a compressed state between the mount unit 150 and the imaging element unit 180.

More specifically, the heat dissipation plate 186 of the imaging element unit 180 has three flanges 185 protruding from the upper part of the imaging element unit 180. The adjustment springs 183 are disposed in a compressed state between the mount base 152 of the mount unit 150 and the flanges 185 of the heat dissipation plate 186. The imaging element unit 180 is thereby subjected, by an elastic force from the adjustment springs 183, to a force acting in the direction away from the mount unit 150.

The three adjustment screws 181 (an example of adjustment screws) are provided to adjust the distance between the mount unit 150 and the imaging element unit 180. Specifically, the elastic force from the adjustment springs 183 is received on the surface of the flanges 185 of the heat dissipation plate 186 by the adjustment screws 181 being screwed into the mount unit 150. It is thereby possible to maintain the distance between the mount unit 150 and the imaging element unit 180.

Three fill tubes 182 (an example of a fill member) are formed into a tube shape using an elastic material such as silicone rubber or an elastomer. Each of the fill tubes 182 is disposed, on an inner periphery side of an adjustment spring 183, so as to be coaxial with respect to the adjustment spring 183. Each of the fill tube 182 is attached in a state in which an adjustment screw 181 is inserted into an inner periphery side of the tube shape.

As the adjustment screws 181 are screwed into the mount base 152, the fill tubes 182 are sandwiched and compressed between the mount base 152 of the mount unit 150 and the flanges 185 of the heat dissipation plate 186.

For the fill tubes 182, a material in which silicone rubber or an elastomer is used as a base and carbon fiber or the like is added may be used in order to improve heat conductivity.

The fill tubes 182 are provided to at least one set comprising an adjustment screw 181 and an adjustment spring 183.

Figure 8:
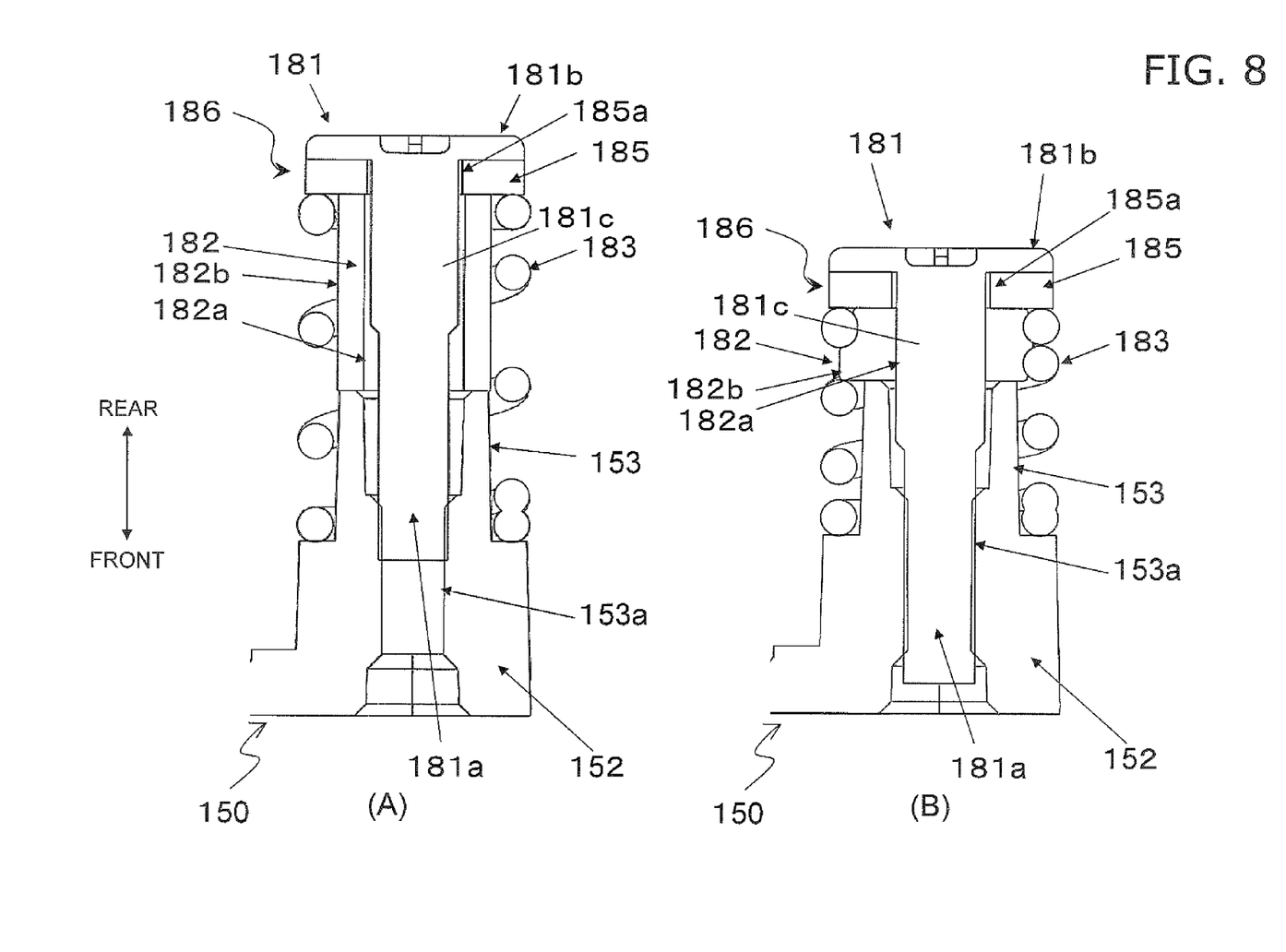
FIGS. 8(A), 8(B), are cross-section views of the vicinity of an adjustment screw included in the imaging unit in, e.g., FIG. 7(A).

More specifically, as shown in FIGS. 8(A) and 8(B), the adjustment screws 181 are screwed into the mount base 152 of the mount unit 150. Each of the adjustment screws 181 has: a threaded part 181a screwed into the mount unit 150; a head part 181b formed at an end part of the threaded part 181a; and an expanded diameter part 181c connecting the threaded part 181a and the head part 181b.

The threaded part 181a has screw grooves formed on an outer peripheral surface. The threaded part 181a is inserted into a through-hole 185a formed in a flange 185 of the heat dissipation plate 186 and threadedly engages with a screw hole 153a formed in a boss part 153 of the mount base 152 (described further below).

The head part 181b is a flange-shaped portion provided at an upper end of the adjustment screw 181 so as to extend radially outwards from an outer peripheral surface of the expanded diameter part 181c, and has a recess formed on the upper surface, the tip of a tool or a similar element being inserted into the recess and caused to rotate. As shown in FIG. 8(B) and other drawings, in the assembled state, the head part 181b is in contact with the flange 185 of the heat dissipation plate 186 on a surface opposite that on which the recess is formed. In other words, the heat dissipation plate 186 (or more specifically, the flange 185) of the imaging element unit 180 is in contact with the threaded part 181a—side surface of the head part 181b of the adjustment screw 181.

The expanded diameter part 181c is formed so that the diameter is greater than that of the threaded part 181a, and the adjustment screws 181 are used as stepped screws. The expanded diameter part 181c has an outside diameter substantially equivalent to the inside diameter of an inner peripheral surface of the tube-shaped portion of the boss part 153.

Since the adjustment screws 181 are provided to adjust the size of the gap between the imaging element unit 180 and the mount unit 150 as described above, a fastened state in which the threaded part 181a is completely screwed into the screw hole 153a is unlikely to be reached.

In such an instance, since there is a gap between the threaded part 181a of the adjustment screw 181 and the screw hole 153a of the boss part 153, there is a risk of the position of the adjustment screw 181 in the vertical/lateral directions relative to the boss part 153 becoming unstable.

In the imaging unit 125 of the present embodiment, the adjustment screw 181 has an outside diameter substantially equivalent to the inside diameter of the inner peripheral surface of the tube-shaped portion of the boss part 153.

It is thereby possible for the expanded diameter part 181c to firmly fit against an inner peripheral surface of the boss part 153 even when there is a loosening of the screw portion in a state in which the threaded part 181a of the adjustment screw 181 and the screw hole 153a of the boss part 153 are threadedly engaged, making it possible to position the adjustment screw 181 in the vertical/lateral directions.

As shown in FIGS. 8(A) and (B), the mount base 152 has three boss parts 153 protruding towards the side at which the imaging element unit 180 is attached. Each of the boss parts 153 has a screw hole 153a formed along the direction in which the imaging element unit 180 is attached. The threaded part 181a of the adjustment screw 181 is screwed into the screw hole 153a of the boss part 153. The boss part 153 is inserted into the inner periphery side of the adjustment spring 183 so as to be coaxial with respect to the adjustment spring 183 and the fill tube 182. The boss parts 153 formed on the mount base 152 positions the adjustment spring 183 in the vertical/lateral directions.

As shown in FIGS. 8(A) and 8(B), the adjustment spring 183 applies an elastic force to press the flange 185 of the heat dissipation plate 186 onto the head part 181b of the adjustment screw 181. Therefore, the adjustment screw 181 and the adjustment spring 183 position the imaging element unit 180 longitudinally relative to the mount unit 150.

The three tube-shaped fill tubes 182 are mounted between the flanges 185 and the mount base 152 so as to be coaxial with respect to the adjustment screws 181 and the adjustment springs 183 (see FIG. 6).

FIG. 8(A) shows the state before the adjustment screws 181 are screwed into the mount base 152. Each of the fill tubes 182 has an inside-diameter part 182a into which the adjustment screw 181 is inserted, and an outside-diameter part 182b inserted into the inner periphery side of the adjustment spring 183. As described above, the fill tube 182 is disposed so as to be coaxial with respect to each of the adjustment screw 181 and the adjustment spring 183.

FIG. 8(B) shows the state after the adjustment screw 181 has been screwed into the mount base 152. As the adjustment screw 181 is screwed in, the distance between the flange 185 and the boss part 153 decreases, whereby the fill tube 182 compressively deforms so that the inside diameter decreases and the outside diameter increases.

In the state shown in FIG. 8(B), the outside-diameter part 182b of the fill tube 182 is in intimate contact with the threaded part 181a, and the outside-diameter part 182b of the fill tube 182 is in intimate contact along the convex/concave shape of the adjustment spring 183. In a state in which the adjustment screw 181 is screwed in as described above, the space between the adjustment screw 181 and the adjustment spring 183 is in a state of being filled by the fill tube 182. Therefore, the area across which the fill tube 182 is in contact with the adjustment screw 181 and the adjustment spring 183 is greater, making it possible to transmit heat via the fill tube 182 in an efficient manner. As a result, the heat generated in the CMOS image sensor 110 can be transmitted to the side of the mount unit 150 in an efficient manner.

In other words, compared to a conventional configuration in which the fill tubes 182 are not present, heat generated by the CMOS image sensor 110 can be efficiently transmitted to the mount unit 150 via the adjustment screws 181, the fill tubes 182, and the adjustment springs 183.

More specifically, as the adjustment screw 181 is screwed in, a rear-side end part of the fill tube 182 inserted into the inner periphery side of the adjustment spring 183 comes into contact with the surface of the flange 185 of the heat dissipation plate 186 of the imaging element unit 180 as seen in FIG. 8(B). A front-side end part of the fill tube 182 is in contact with an end part of the boss part 153 provided upright on the mount base 152. In a state in which the adjustment screw 181 is screwed into the boss part 53 as described above, the fill tube 182 reaches a state of being expanded towards the inside diameter side and the outside diameter side, and the area of contact between the fill tube 182 and the adjustment screw 181 as well as the adjustment spring 183 increases.

Heat generated in the side of the imaging element unit 180 is thereby transmitted in an efficient manner to the side of the mount unit 150 via the heat dissipation plate 186, the fill tube 182, the adjustment spring 183, the adjustment screw 181, and the boss part 153 of the mount base 152.

6. Main Features of the Digital Camera 1

In the imaging unit 125 of the digital camera 1 according to the present embodiment, when assembled, the mount unit 150 and the imaging element unit 180 are thermally connected via the adjustment screws 181, the adjustment springs 183, and the fill tubes 182.

Therefore, compared to a conventional configuration in which the mount unit 150 and the imaging element unit 180 are connected only by the adjustment screws 181 and the adjustment springs 183, the heat generated in the imaging element unit 180 is transmitted to the mount unit 150 more efficiently, and the efficiency of heat dissipation during actuation can be improved.

Since the fill tubes 182 are formed from an elastic material, adjustment during assembly is not obstructed. In a state in which the adjustment screws 181 are screwed in, the adjustment screws 181 and the fill tubes 182 are in intimate contact with each other, and each of the fill tubes 182 enters the space within the spiral-shaped coiled wires constituting the adjustment spring 183, and the heat between the coiled wires is transmitted directly to the mount unit via the fill tube 182.

Therefore, heat is more readily transmitted from the imaging element unit 180 to the mount unit 150 than in a spiral shape through the coiled wires of the adjustment spring 183 only, making it possible to further improve the heat dissipation efficiency.

Also, in the imaging unit 125 of the present embodiment, the fill tubes 182 are disposed in the inner periphery side of the adjustment springs 183.

As a result, as the adjustment screws 181 are screwed in, the fill tubes 182 sandwiched and compressed between the flanges 185 of the heat dissipation plate 186 and the boss parts 153 of the mount base 152 expand towards the inside diameter side and the outside diameter side. At this time, the area of contact between the adjustment springs 183 and the fill tubes 182 as well as the adjustment screws 181 increases. It is therefore possible to efficiently transmit the heat generated in the imaging element unit 180 to the mount unit 150.

In the imaging unit 125 of the present embodiment, the focal plane shutter device 190 is disposed so as to be sandwiched between the imaging element unit 180 and the mount unit 150 across which heat is transmitted.

Heat generated in the imaging element unit 180 is transmitted from the flanges 185 of the heat dissipation plate 186 disposed at an end part of the imaging element unit 180 to the boss parts 153 of the mount base 152 via the adjustment screws 181, the fill tubes 182, the adjustment springs 183, and the like.

The route of transmission of heat from the imaging element unit 180 to the mount unit 150 is provided from a part of an outer edge part of the imaging element unit 180 to a part of the outer edge part of the mount unit 150. Therefore, the focal plane shutter device 190 disposed so as to be sandwiched between the imaging element unit 180 and the mount unit 150 can be prevented from being affected by heat.

7. Other Embodiments

The present disclosure is not limited to the aforementioned embodiment; a variety of amendments and modifications can be made without departing from the scope of the present disclosure.

(A)

In the aforementioned embodiment, a description was given for an imaging element according to the present technique using the CMOS image sensor 110 as an example. However, the imaging element according to the present technique is not limited to the CMOS image sensor 110 described in the above embodiment.

For example, the imaging element may be a charge-coupled device (CCD) image sensor or another sensor, as long as the configuration is capable of generating image data representing the subject by photoelectric conversion (B)

In the aforementioned embodiment, a description was given for a mount unit according to the present technique, using the mount unit 150 as an example. However, the mount unit according to the present technique is not limited to the mount unit 150 described in the above embodiment.

For example, the mount unit may be an integrally formed member, as long as the interchangeable lens unit 200 can be mounted.

(C)

In the aforementioned embodiment, a description was given for a configuration in which the fill tubes 182 are disposed in the inner periphery side of the adjustment springs 183. However, in the present technique, the positional relationship between the adjustment springs 183 and the fill tubes 182 is not limited to that described in the above embodiment.

For example, each of the fill tubes 182 may be disposed coaxially on an outer periphery side of each of the adjustment springs 183. In this instance, in a state in which the adjustment screw 181 is screwed in, the fill tube 182 enters the space between the spiral-shaped coiled wires from the outer periphery side of the adjustment spring 183. As a result, the same effect as that of the above embodiment can be obtained.

In essence, in the present technique, the adjustment springs 183 and the fill tubes 182 need only be disposed coaxially with respect to each other.

(D)

In the aforementioned embodiment, a description was given for a configuration in which the fill tubes 182 are disposed on the rear side of the boss parts 153. However, in the present technique, the positional relationship between the boss parts 153 and the fill tubes 182 is not limited to that described on the above embodiment.

For example, each of the fill tubes 182 may be disposed on an outer periphery side of a boss part 153 and the inner periphery side of an adjustment spring 183 so that the three members are disposed coaxially with respect to each other.

In essence, the three components comprising the adjustment screw 181, the adjustment spring 183, and the fill tube 182 need only be disposed coaxially with respect to each other.

Embodiments were described above as examples of the technology disclosed herein, and the appended drawings and detailed description as a best mode were provided to that end. Therefore, the constituent elements shown in the appended drawings and discussed in the detailed description may include not only constituent elements that are essential to solving the problem, but also constituent elements that are not essential to solving the problem.

Accordingly, just because these non-essential constituent elements are illustrated in the appended drawings and discussed in the detailed description, it should not be concluded that these non-essential constituent elements are essential.

Also, the above embodiments are intended to illustrate examples of the technology disclosed herein, so various modifications, substitutions, additions, omissions, and so forth can be made within the scope of the patent claims or equivalents thereof.

General Interpretation of Terms

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. An imaging unit configured to generate image data from an optical image of a subject formed by an interchangeable lens unit, the imaging unit comprising:
   a mount unit capable of having the interchangeable lens unit mounted thereto;
   an imaging element unit disposed so that a gap is present with respect to the mount unit, the imaging element unit configured to generate image data representing the subject by photoelectric conversion;
   a plurality of elastic members disposed in a compressed state between the mount unit and the imaging element unit;
   a plurality of adjustment screws configured to adjust the distance between the mount unit and the imaging element unit, the adjustment screws being disposed coaxially with respect to each of the elastic members and mounted on the mount unit and/or the imaging element unit; and
   a filler member disposed coaxially with respect to at least one set comprising an elastic member and an adjustment screw, the filler member being compressed from either side between the mount unit and the imaging element unit when the adjustment screw is tightened,
   wherein the filler member is provided on an inner periphery side or an outer periphery side of the elastic member.

2. The imaging unit according to claim 1, wherein the filler member is provided on an inner periphery side of the elastic member.

3. The imaging unit according to claim 1, wherein
   the imaging element unit has an imaging element configured to generate image data from the optical image of the subject by photoelectric conversion, and a plate member mounted on the imaging element; and
   the elastic member is sandwiched between the mount unit and the plate member.

4. The imaging unit according to claim 3, wherein
   the plate member is sandwiched between a head part of the adjustment screw, and the elastic member.

5. The imaging unit according to claim 1, further comprising:
   a shutter device configured to adjust the amount of light incident on the imaging element unit, the shutter device being provided between the mount unit and the imaging element unit.

6. The imaging unit according to claim 2, wherein
   the imaging element unit has an imaging element configured to generate image data from the optical image of the subject by photoelectric conversion, and a plate member mounted on the imaging element; and
   the elastic member is sandwiched between the mount unit and the plate member.

7. The imaging unit according to claim 6, wherein
   the plate member is sandwiched between a head part of the adjustment screw, and the elastic member.

8. The imaging unit according to claim 2, further comprising:
   a shutter device configured to adjust the amount of light incident on the imaging element unit, the shutter device being provided between the mount unit and the imaging element unit.

9. The imaging unit according to claim 3, further comprising:
   a shutter device configured to adjust the amount of light incident on the imaging element unit, the shutter device being provided between the mount unit and the imaging element unit.

10. The imaging unit according to claim 4, further comprising:
    a shutter device configured to adjust the amount of light incident on the imaging element unit, the shutter device being provided between the mount unit and the imaging element unit.

11. The imaging unit according to claim 6, further comprising:
    a shutter device configured to adjust the amount of light incident on the imaging element unit, the shutter device being provided between the mount unit and the imaging element unit.

12. The imaging unit according to claim 7, further comprising:
    a shutter device configured to adjust the amount of light incident on the imaging element unit, the shutter device being provided between the mount unit and the imaging element unit.

13. An imaging unit configured to generate image data from an optical image of a subject formed by an interchangeable lens unit, the imaging unit comprising:
    a mount unit capable of having the interchangeable lens unit mounted thereto;
    an imaging element unit disposed so that a gap is present with respect to the mount unit, the imaging element unit configured to generate image data representing the subject by photoelectric conversion, wherein the image data is generated from the optical image of the subject by photoelectric conversion, and a plate member mounted on the imaging element;
    a plurality of elastic members disposed in a compressed state between the mount unit and the imaging element unit;
    a plurality of adjustment screws configured to adjust the distance between the mount unit and the imaging element unit, the adjustment screws being disposed coaxially with respect to each of the elastic members and mounted on the mount unit and/or the imaging element unit; and
    a filler member disposed coaxially with respect to at least one set comprising an elastic member and an adjustment screw, the filler member being compressed from either side between the mount unit and the imaging element unit when the adjustment screw is tightened, wherein the elastic member is sandwiched between the mount unit and the plate member.

* * * * *